US012638467B2

(12) United States Patent
Karadkar et al.

(10) Patent No.: US 12,638,467 B2
(45) Date of Patent: May 26, 2026

(54) FLUID ANALYSIS SYSTEMS AND RELATED METHODS OF ANALYZING FOAM RHEOLOGY

(71) Applicant: Saudi Arabian Oil Company, Dhahran (SA)

(72) Inventors: Prasad Baburao Karadkar, Al-Khobar (SA); Tamim Alshehri, Al-Aziziyah (SA)

(73) Assignee: Saudi Arabian Oil Company, Dhahran (SA)

( * ) Notice: Subject to any disclaimer, the term of this patent is extended or adjusted under 35 U.S.C. 154(b) by 294 days.

(21) Appl. No.: 18/461,129

(22) Filed: Sep. 5, 2023

(65) Prior Publication Data

US 2025/0076333 A1    Mar. 6, 2025

(51) Int. Cl.
 *G01N 35/10*       (2006.01)
 *B01F 23/20*       (2022.01)
 *B01F 23/235*      (2022.01)

(52) U.S. Cl.
 CPC ....... *G01N 35/1016* (2013.01); *B01F 23/235* (2022.01); *B01F 23/291* (2022.01); *G01N 2035/1018* (2013.01)

(58) Field of Classification Search
 CPC ....... G01N 35/1016; G01N 2035/1018; G01N 2291/02433; G01N 11/00; G01N 11/02; G01N 11/08; G01N 2291/02828; G01N 2013/025; B01F 23/235; B01F 23/291; B01F 2101/23; B01F 34/214

USPC ........... 73/53.01, 54.01–54.43, 60.11, 61.43, 73/61.44, 61.45, 64.44
See application file for complete search history.

(56) References Cited

U.S. PATENT DOCUMENTS

| | | | |
|---|---|---|---|
| 7,569,522 B2 | 8/2009 | Pena et al. | |
| 9,085,975 B2 | 7/2015 | Abad | |
| 2017/0097293 A1 | 4/2017 | Tozzi et al. | |
| 2018/0045704 A1* | 2/2018 | Al-Otaibi | ........... G01N 15/0826 |

FOREIGN PATENT DOCUMENTS

| | | | |
|---|---|---|---|
| CA | 3056297 A1 * | 9/2018 | ............... C11B 1/10 |
| CN | 102305752 | 1/2013 | |
| JP | H1171467 A * | 3/1999 | |

OTHER PUBLICATIONS

Karadkar et al., "CO2 Foamed Fracturing Fluids for High Temperature Hydraulic Fracturing," presented at the Middle East Oil, Gas, and Geosciences Show, Manama, Bahrain, Feb. 19, 2023, 10 pages.

* cited by examiner

*Primary Examiner* — Robert R Raevis
(74) *Attorney, Agent, or Firm* — Fish & Richardson P.C.

(57) ABSTRACT

A fluid analysis system includes a fluid circuit and a foam generator positioned along the fluid circuit. The foam generator is configured to receive a gas and a viscous fluid to produce a fluid mixture. The fluid analysis system further includes a helical coil positioned along the fluid circuit downstream of the foam generator and configured to receive the fluid mixture. The fluid analysis system further includes one or more processors for determining a foam rheology of the fluid mixture after the fluid mixture flows through the helical coil.

17 Claims, 3 Drawing Sheets

FLUID ANALYSIS SYSTEMS AND RELATED METHODS OF ANALYZING FOAM RHEOLOGY

TECHNICAL FIELD

This disclosure relates to fluid analysis systems and related methods for analyzing the foam rheology of viscous fluids used in oil and gas applications.

BACKGROUND

The carbon dioxide ($CO_2$) foam rheology of fracturing fluids is sometimes measured using a closed-loop fluid circuit that employs a gear pump. A significant disadvantage to this technique is that the gear pump causes mechanical degradation of the crosslinked fracturing fluid during circulation around the closed loop. In other implementations, pipe viscometers are used to measure foam properties. Utilizing a pipe viscometer, a fluid is pumped at a steady rate, and a differential pressure across the pipe is measured to calculate rheological inputs. In some cases, circulating flow-type pipe viscometers are used to measure foam viscosity. In such cases, fluid is circulated using a gear pump; however, crosslinked fracturing fluids tend to degrade mechanically when circulated with a gear pump.

SUMMARY

This disclosure relates to fluid analysis systems and related methods for analyzing viscous fluids. In some embodiments, a fluid analysis system is a single-pass system by which the foam rheology of a viscous fluid can be determined.

In one aspect, a fluid analysis system includes a fluid circuit and a foam generator positioned along the fluid circuit. The foam generator is configured to receive a gas and a viscous fluid to produce a fluid mixture. The fluid analysis system further includes a helical coil positioned along the fluid circuit downstream of the foam generator and configured to receive the fluid mixture. The fluid analysis system further includes one or more processors for determining a foam rheology of the fluid mixture after the fluid mixture flows through the helical coil.

Embodiments may provide one or more of the following features.

In some embodiments, the fluid analysis system is operated to analyze one or more of a fracturing fluid, a well stimulation fluid, and a foamed fracturing fluid.

In some embodiments, the fluid analysis system may be provided as an acid system or as a foamed acid system.

In some embodiments, the fluid analysis system further includes a mass flow controller positioned along the fluid circuit and configured to pump the gas into the fluid circuit.

In some embodiments, the fluid analysis system further includes a pump positioned along the fluid circuit and configured to pump an actuation fluid into the circuit and an accumulator positioned along the fluid circuit and upstream of the foam generator for receiving the actuation fluid.

In some embodiments, the accumulator includes a piston that defines a liquid chamber that receives the viscous fluid prior to a start of a flow cycle and an actuation chamber that receives the actuation fluid during the flow cycle.

In some embodiments, the fluid analysis system is configured such that the actuation fluid acts on the piston to move the viscous fluid out of the liquid chamber into the fluid circuit during the flow cycle.

In some embodiments, the fluid analysis system further includes a view cell positioned along the fluid circuit downstream of the helical coil, and the fluid circuit includes a bypass line that runs fluidically parallel to the view cell.

In some embodiments, the fluid analysis system further includes a mass flow meter positioned along the fluid circuit downstream of the helical coil, the foam rheology includes a foam quality, and the fluid analysis system is configured to determine the foam quality based on one or more measurements acquired at the mass flow meter.

In some embodiments, the fluid mixture includes a foam.

In some embodiments, the foam rheology includes a viscosity of the fluid mixture.

In some embodiments, the fluid circuit is an open fluid circuit.

In some embodiments, the fluid analysis system is a single-pass system.

In some embodiments, the viscous fluid is a fracturing fluid.

In some embodiments, the viscous fluid is a crosslinked gel.

In some embodiments, the gas includes $CO_2$ in a supercritical state.

In some embodiments, the fluid analysis system is a foam rheometer.

In another aspect, a method of analyzing a viscous fluid includes flowing a gas and the viscous fluid into a foam generator positioned along a fluid circuit, producing a fluid mixture from the gas and the viscous fluid at the foam generator, flowing the fluid mixture through a helical coil positioned along the fluid circuit and downstream of the foam generator, and determining, via one or more processors, a foam rheology of the fluid mixture after the fluid mixture flows through the helical coil in a single pass.

Embodiments may provide one or more of the following features.

In some embodiments, the method further includes depositing the viscous fluid within an accumulator positioned along the fluid circuit and upstream of the foam generator and pumping an actuation fluid against a piston within the accumulator to move the viscous fluid out of the accumulator and into the fluid circuit.

In some embodiments, the foam rheology includes a foam quality, and the method further includes determining the foam quality based on one or more measurements acquired at the mass flow meter positioned along the fluid circuit downstream of the helical coil.

In some embodiments, the fluid circuit is an open fluid circuit.

In some embodiments, the viscous fluid is a fracturing fluid.

The details of one or more embodiments are set forth in the accompanying drawings and description. Other features, aspects, and advantages of the embodiments will become apparent from the description, drawings, and claims.

DETAILED DESCRIPTION

Figure 1:
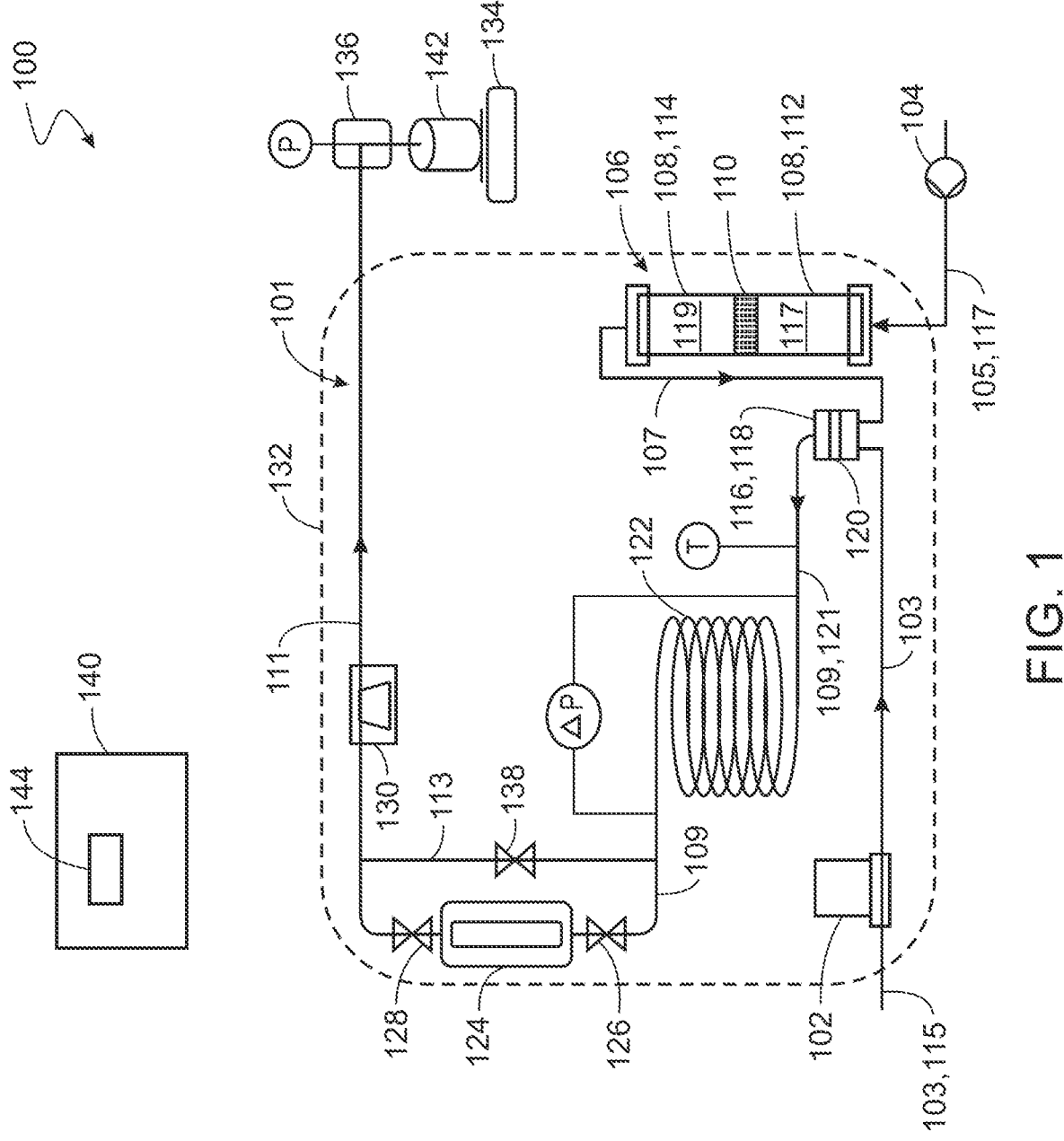
FIG. 1 is a schematic view of an example fluid analysis system.

FIG. 1 illustrates an example fluid analysis system 100 (e.g., a foam rheometer) designed for determining rheological properties (e.g., foam rheology of $CO_2$) of a viscous fluid 119 (e.g., a fracturing fluid utilized in oil and gas applications). Example viscous fluids that may be analyzed using the system 100 include cross-linked gels, drilling fluids, acidic fluids, suspensions, emulsions, oil-based viscous fluids, viscoelastic fluids, viscous fluids containing nanoparticles, and viscous fluids containing particulates, fibers, or other components that modify the relative permeability of the viscous fluid. The system 100 includes a fluid circuit 101 (e.g., an open fluid circuit) formed of multiple flow lines, several components arranged along the fluid circuit 101, and an oven 132 that surrounds or otherwise houses at least a portion of a majority of the flow lines and components.

The system 100 also includes a computerized control system 140 that controls operations of the various components of the system 100 to carry out a flow cycle for determining the rheological properties. For example, in some embodiments, the system 100 is accordingly a single-pass fluid analysis system. The control system 140 includes one or more processors 144 that can execute one or more programs for capturing, determining, or calculating one or more measurements or rheological properties discussed further below.

The fluid analysis system 100 includes a mass flow controller 102 (e.g., a Coriolis mass flow controller or another type of mass flow controller) positioned along a flow line 103 (e.g., an inlet line) for pumping a gas 115 (e.g., $CO_2$) into the fluid circuit 101. In other embodiments, a different gas may be introduced into the system 100, such as nitrogen ($N_2$), hydrogen ($H_2$), methane ($CH_4$), natural gas, or helium (He). The mass flow controller 102 may be provided as a pump. The mass flow controller 102 is operable to maintain a constant flow rate of the gas 115 during the flow cycle. In some implementations, $CO_2$ in the form of a liquid or a supercritical state (e.g., instead of in the form of a gas) is pumped into the flow line 103. The system 100 also includes a pump 104 (e.g., a syringe pump) positioned along a flow line 105 (e.g., an inlet line) for pumping an actuation fluid 117 (e.g., water or mineral oil) into the fluid circuit 101.

The system 100 includes an accumulator 106 to which the flow line 105 leads and a flow line 107 that extends in a downstream flow direction from the accumulator 106. The accumulator 106 includes a housing 108 and a piston 110 that is movable to divide the housing 108 into an actuation chamber 112 and a liquid chamber 114. At a start of the flow cycle, a total volume of the liquid chamber 114 substantially coincides with a total volume of the housing 108. In some embodiments, the housing 108 has an internal volume capacity of about 0.5 liters (L) to about 2 L. The actuation fluid 117 is pumped into the actuation chamber 114 to drive (e.g., push) the piston 110 downstream within the accumulator 106, thereby reducing the volume of the liquid chamber 114 and correspondingly forming the actuation chamber 112 within the housing 108. The liquid chamber 114 contains a viscous fluid 119 to be analyzed within the system 100. For example, the viscous fluid 119 may be introduced into the accumulator 106 prior to a start of the flow cycle. Downstream movement of the piston 110 forces the viscous fluid 119 out of the accumulator 106 and into the flow line 107. The flow cycle is complete once the housing 108 has been emptied such that the total volume of the actuation chamber 112 substantially coincides with total volume of the housing 108.

The flow lines 103, 107 lead into a foam generator 116 to deliver the gas 115 and the viscous fluid 119 to the foam generator 116. The foam generator 116 includes a housing 118 and one or more of porous metal discs, sand and proppant beds, glass beads, and ceramic beads that are arranged in a packed bed 120. The foam generator 116 produces a fluid mixture 121 that includes a gas phase, a liquid phase, and a foam phase or a mixture of both. The fluid analysis system 100 further includes a flow line 109 that extends downstream from the foam generator 116 and a helical coil 122 positioned along the flow line 109.

The fluid mixture 121 is pumped through the helical coil 122 in a single pass along the flow line 109 at a constant flow rate. Accordingly, the helical coil 122 is provided a single-pass helical coil. The helical coil 122 advantageously has a compact footprint, as opposed to a relatively large footprint (e.g., in length) that would otherwise be required to accommodate a straight tube. In some embodiments, the helical coil 122 has an inner diameter of about 1.2 millimeters (mm) to about 25.4 mm and a total (e.g., extended) length of about 0.3 meters (m) to about 30.5 m. The fluid mixture 121 experiences a pressure drop across the helical coil 122 such that there is a differential pressure across the helical coil 122. A shear rate of the fluid mixture 121 may be calculated from the flow rate of the fluid mixture 121, and a shear stress of the fluid mixture 121 may be calculated from the differential pressure. A viscosity of the fluid mixture 121 can then be calculated using a ratio of the shear stress to the shear rate according to the Power Law Model. A temperature is measured just before the helical coil and is recorded as a test temperature.

A desired foam quality of the fluid mixture 121 can be maintained as a result of the constant flow rates of the gas 115 and the actuation fluid 117. The foam quality $\Gamma(\%)$ at a given temperature and pressure may be calculated according to equation (1):

$$\Gamma = \frac{100 V_g}{V_g + V_l} \tag{1}$$

where $V_g$ is the total flow volume of the gas 115 and $V_l$ is the total flow volume of the viscous fluid 119. In some implementations, the foam quality $\Gamma$ should be maintained at least at about 25% to ensure an integrity of the measurements performed using the fluid analysis system 100.

The fluid analysis system 100 includes a view cell 124 to which the flow line 109 leads, as well as a flow line 111 that extends in a downstream fluid direction from the view cell 124. Valves 126, 128 (e.g., isolation valves) are respectively positioned along the flow lines 109, 111 upstream and downstream of the view cell 124. The fluid mixture 121 can flow through the view cell 124 when the valves 126, 128 are open. A foam decay behavior of the fluid mixture 121 (e.g., a foam half-life) can be measured at the view cell 124 under static conditions (e.g., by observing the foam height with respect to time). A flow line 113 (e.g., a bypass line) extends between the flow lines 109, 111 in a direction that is fluidically parallel to the flow direction through the view cell 112. The flow line 113 is equipped with a valve 138 (e.g. an isolation valve). The fluid mixture 121 can bypass the view cell 124 and flow through the flow line 113 when the valve 126 is closed and the valve 138 is open.

A mass flow meter 130 (e.g., a Coriolis mass flow meter or another type of mass flow meter) is positioned along the flow line 111 and allows measurements of the densities of the gas, liquid, and foam phases of the fluid mixture 121 for calculating the foam quality Γ. For example, the densities are used to calculate the volumes needed for equation (1) provided above. The fluid analysis system 100 further includes a fluid receptacle 142 to which the flow line 111 leads. The fluid receptacle 142 is supported on a balance 134. The system 100 also includes a back pressure regulator 136 positioned along the flow line 111 just upstream of the fluid receptacle 142. The flow rates of the gas 115 and the fluid mixture 121 can be verified using the balance 134 and the back pressure regulator 136.

Figure 2:
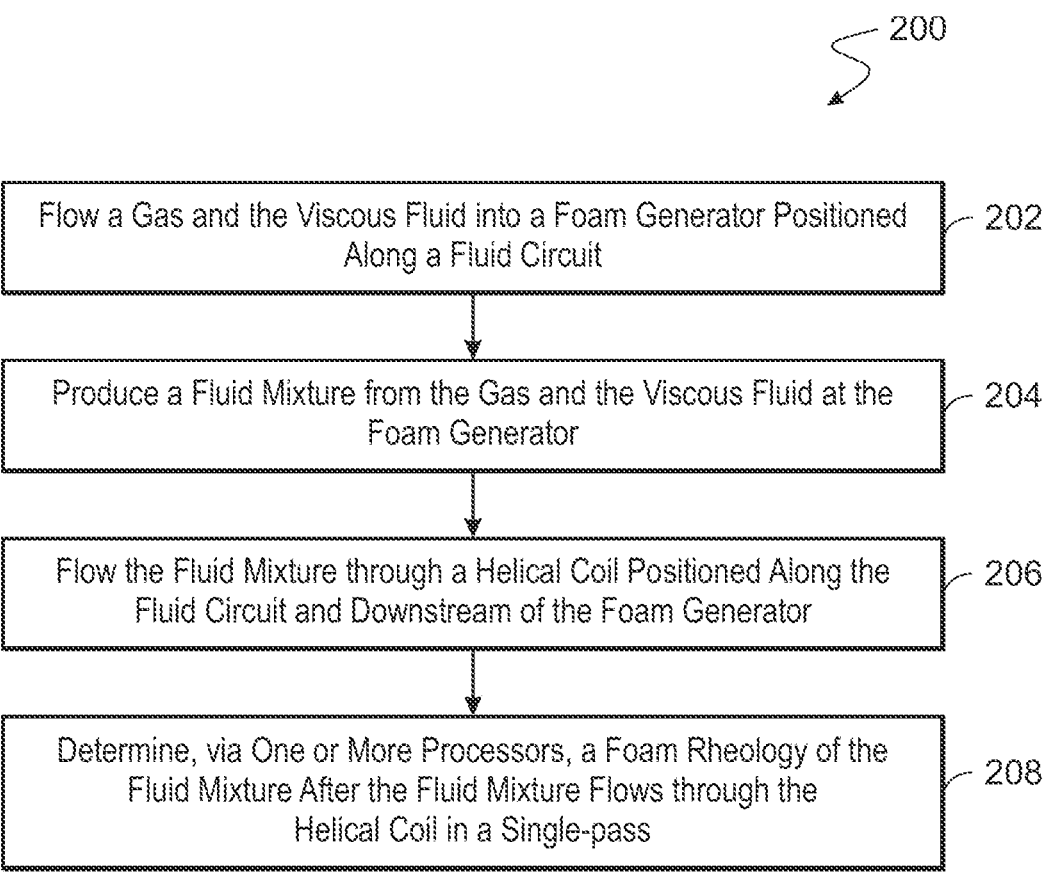
FIG. 2 is a flow chart illustrating an example method of analyzing a viscous fluid using the fluid analysis system of FIG. 1.

FIG. 2 is a flow chart illustrating an example method 200 of analyzing a viscous fluid (e.g., the viscous fluid 119). In some embodiments, the method 200 includes a step 202 for flowing a gas (e.g., the gas 115) and the viscous fluid into a foam generator (e.g., the foam generator 116) positioned along a fluid circuit (e.g., the fluid circuit 101). In some embodiments, the method 200 includes a step 204 for producing a fluid mixture (e.g., the fluid mixture 121) from the gas and the viscous fluid at the foam generator. In some embodiments, the method 200 includes a step 206 for flowing the fluid mixture through a helical coil (e.g., the helical coil 122) positioned along the fluid circuit and downstream of the foam generator. In some embodiments, the method 200 includes a step 208 for determining, via one or more processors (e.g., the one or more processors 144), a foam rheology of the fluid mixture after the fluid mixture flows through the helical coil in a single-pass.

The fluid analysis system 100 advantageously enables measurement of the viscosity of the viscous fluid 119 (e.g., a crosslinked gel or another type of viscous fluid) that is not skewed by mechanical shear or degradation that would otherwise be caused by a gear pump in a conventional closed-loop circuit design of a rheometer. That is, analyzing the viscous fluid 119 in the fluid analysis system 100 (e.g., including the open fluid circuit 101) via a single pass of the viscous fluid 119 through the helical coil 122 avoids mechanical degradation of the viscous fluid 119 that would otherwise result in other systems and therefore render the viscosity measurements inaccurate or imprecise.

Figure 3:
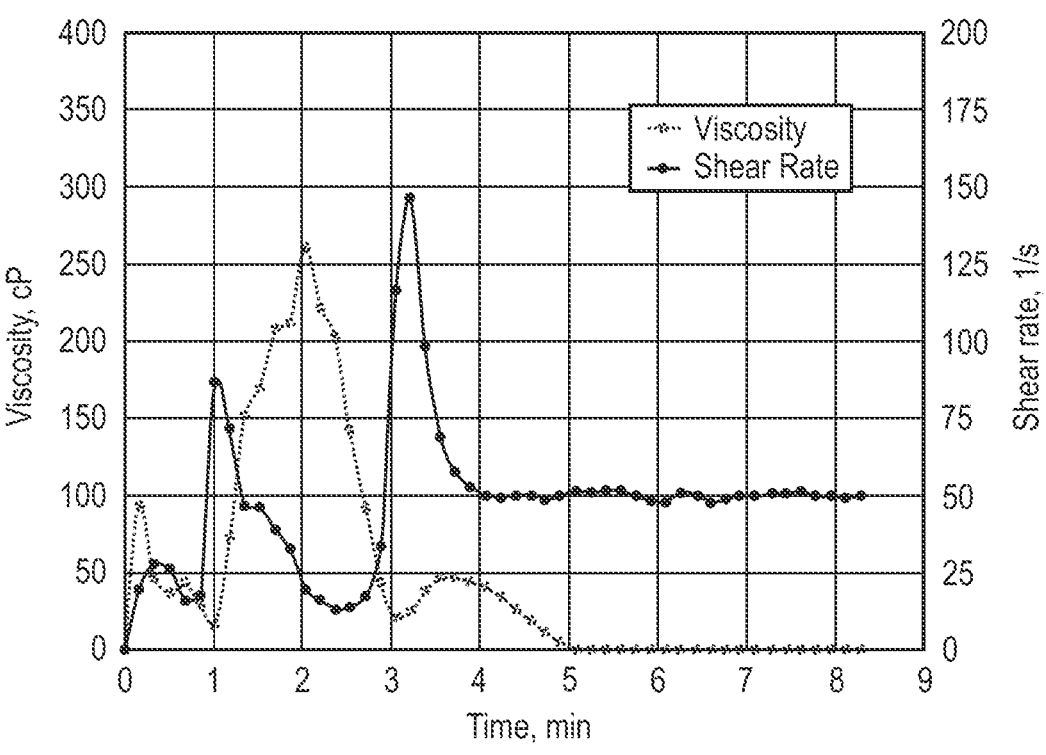
FIG. 3 is a graph of viscosity measurements of a fluid that were obtained using a gear pump that circulated the fluid using a circulating flow pipe viscometer.

For example, FIG. 3 illustrates viscosity measurements of a fluid that were obtained using a gear pump that circulated the fluid using a circulating flow pipe viscometer. In this example, 35 lb/1000 gal acrylamide-based terpolymer cross-linked with zirconated crosslinker gelled and experienced viscosity degradation due to the shearing effect of the gear pump used to circulate the fluid. This test was carried out at a shear rate of 50 l/s at room temperature. As shown in FIG. 3, the viscosity of crosslinked gel mechanically degraded within 5 minutes. This test was conducted at room temperature to eliminate the contribution of thermal degradation of the crosslinked gel.

Figure 4:
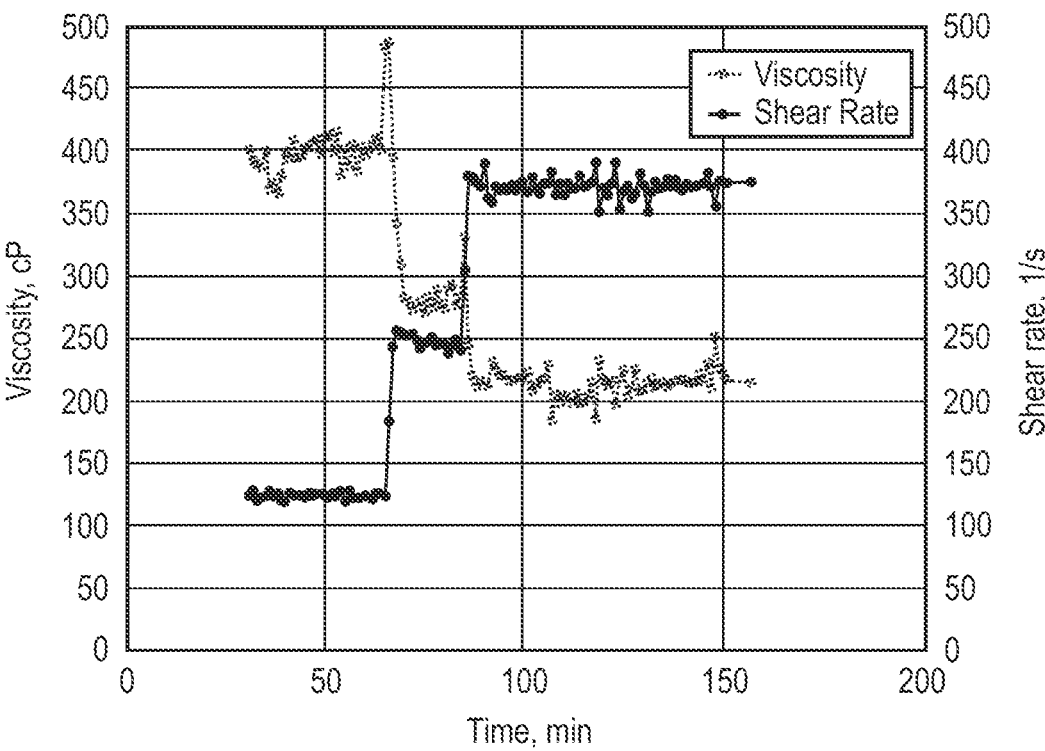
FIG. 4 is a graph of viscosity measurements of a fluid that were obtained in a system where the effect of mechanical degradation was removed.

In contrast, FIG. 4 illustrates viscosity measurements of a fluid that were obtained in a system where the effect of mechanical degradation was removed. In this example, a crosslinked gel was pumped using a syringe pump. A 35 lb/1000 gal acrylamide-based terpolymer crosslinked with zirconated crosslinker had a viscosity that was substantially constant with shear rate. This test was conducted at 300° F. and 1,000 psi and conducted by pumping crosslinked gel at constant rates of 2, 4, and 6 milliliters (mL)/minute using a syringe pump through a 0.055 inch ID smooth stainless steel tube having a length of 15 feet. Constant viscosities of 399.3 cP, 282.1 cP, and 214.4 cP were respectively observed at shear rates of 123.9 l/s, 247.4 l/s, and 371.1 l/s.

While the fluid analysis system 100 has been described and illustrated with respect to certain dimensions, sizes, shapes, arrangements, materials, and methods 200, in some embodiments, a system that is otherwise substantially similar in construction and function to the system 100 may include one or more different dimensions, sizes, shapes, arrangements, configurations, and materials or may be utilized according to different methods. Accordingly, other embodiments are within the scope of the following claims.

What is claimed is:

1. A fluid analysis system comprising:
   a fluid flow line system;
   a foam generator positioned along the fluid flow line system and configured to receive a gas and a viscous fluid to produce a fluid mixture;
   a helical coil positioned along the fluid flow line system downstream of the foam generator and configured to receive the fluid mixture; and
   one or more processors for determining a foam rheology of the fluid mixture after the fluid mixture flows through the helical coil,
   wherein the fluid flow line system comprises a fluid inlet end and a fluid outlet end that is separated from the fluid inlet end such that the fluid flow line system forms an open fluid flow configuration, and
   wherein the fluid analysis system comprises a single-pass system.

2. The fluid analysis system of claim 1, further comprising a mass flow controller positioned along the fluid flow line system and configured to pump the gas into the fluid flow line system.

3. The fluid analysis system of claim 1, further comprising:
   a pump positioned along the fluid flow line system and configured to pump an actuation fluid into the flow line system; and
   an accumulator positioned along the fluid flow line system and upstream of the foam generator for receiving the actuation fluid.

4. The fluid analysis system of claim 3, wherein the accumulator comprises a piston that defines:
   a liquid chamber that receives the viscous fluid prior to a start of a flow cycle; and
   an actuation chamber that receives the actuation fluid during the flow cycle.

5. The fluid analysis system of claim 4, wherein the fluid analysis system is configured such that the actuation fluid acts on the piston to move the viscous fluid out of the liquid chamber into the fluid flow line system during the flow cycle.

6. The fluid analysis system of claim 1, further comprising a view cell positioned along the fluid flow line system downstream of the helical coil, wherein the fluid flow line system comprises a bypass line that runs fluidically parallel to the view cell.

7. The fluid analysis system of claim 1, further comprising a mass flow meter positioned along the fluid flow line system downstream of the helical coil.

8. The fluid analysis system of claim 1, wherein the fluid mixture comprises a foam.

9. The fluid analysis system of claim 1, wherein the foam rheology comprises a viscosity of the fluid mixture.

10. The fluid analysis system of claim 1, wherein the viscous fluid comprises a fracturing fluid.

11. The fluid analysis system of claim 1, wherein the viscous fluid comprises a crosslinked gel.

12. The fluid analysis system of claim 1, wherein the gas comprises $CO_2$ in a supercritical state.

13. The fluid analysis system of claim 1, wherein the fluid analysis system is a foam rheometer system.

14. A method of analyzing a viscous fluid, the method comprising:

flowing a gas and the viscous fluid into a foam generator positioned along a fluid flow line system;

producing a fluid mixture from the gas and the viscous fluid at the foam generator;

flowing the fluid mixture through a helical coil positioned along the fluid flow line system and downstream of the foam generator; and determining, via one or more processors, a foam rheology of the fluid mixture after the fluid mixture flows through the helical coil in a single pass, wherein the fluid flow line system comprises a fluid inlet end and a fluid outlet end that is separated from the fluid inlet end such that the fluid flow line system forms an open fluid flow line system, and wherein the fluid analysis system comprises a single-pass system.

15. The method of claim 14, further comprising:

depositing the viscous fluid within an accumulator positioned along the fluid flow line system and upstream of the foam generator; and pumping an actuation fluid against a piston within the accumulator to move the viscous fluid out of the accumulator and into the fluid flow line system.

16. The method of claim 14, wherein the foam rheology comprises a foam quality.

17. The method of claim 14, wherein the viscous fluid comprises a fracturing fluid.

* * * * *